United States Patent
Rastogi et al.

(10) Patent No.: US 11,922,899 B2
(45) Date of Patent: Mar. 5, 2024

(54) METHOD AND ELECTRONIC DEVICE FOR DETERMINING DYNAMIC RESOLUTION FOR APPLICATION OF ELECTRONIC DEVICE

(71) Applicant: SAMSUNG ELECTRONICS CO., LTD., Suwon-si (KR)

(72) Inventors: Sulabh Rastogi, Uttar Pradesh (IN); Hemanth Chenna, Uttar Pradesh (IN); Dileep Pudi, Uttar Pradesh (IN); Pioush Kumar, Uttar Pradesh (IN); Pankaj Chanchlani, Uttar Pradesh (IN); Saurabh Pareek, Uttar Pradesh (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 326 days.

(21) Appl. No.: 17/418,993

(22) PCT Filed: Jun. 21, 2021

(86) PCT No.: PCT/KR2021/007732
§ 371 (c)(1),
(2) Date: Jun. 28, 2021

(87) PCT Pub. No.: WO2022/014885
PCT Pub. Date: Jan. 20, 2022

(65) Prior Publication Data
US 2023/0154432 A1    May 18, 2023

(30) Foreign Application Priority Data
Jul. 17, 2020  (IN) .............................. 202041030574

(51) Int. Cl.
*G09G 5/00*          (2006.01)

(52) U.S. Cl.
CPC ......... *G09G 5/005* (2013.01); *G09G 2340/04* (2013.01)

(58) Field of Classification Search
CPC .... G09G 2340/04; G09G 5/005; G09G 5/373; G06F 3/1438
See application file for complete search history.

(56) References Cited

U.S. PATENT DOCUMENTS

| 6,388,679 B1 | 5/2002 | KLuck et al. |
| 2003/0030613 A1 | 2/2003 | Chae |

(Continued)

FOREIGN PATENT DOCUMENTS

| JP | 2000-278683 A | 10/2000 |
| KR | 10-2012-0131450 A | 12/2012 |
| WO | 2017/069551 A1 | 4/2017 |

OTHER PUBLICATIONS

International Search Report (PCT/ISA/210) dated Sep. 23, 2021 by the International Searching Authority in counterpart International Patent Application No. PCT/KR2021/007732.

(Continued)

*Primary Examiner* — Abbas I Abdulselam
(74) *Attorney, Agent, or Firm* — Sughrue Mion, PLLC

(57) ABSTRACT

A method for identifying a dynamic resolution for an application (150) of an electronic device (100) is provided. The method includes identifying, by the electronic device, a base resolution for a window of the application (150), wherein the window includes a plurality of views; identifying, by the electronic device, a plurality of resolutions respectively corresponding to the plurality of views based on the base resolution and at least one characteristic of each of the plurality of views; applying, by the electronic device, the plurality of resolutions to the plurality of views, respec- (Continued)

tively; and displaying, by the electronic device, the plurality of views in the plurality of resolutions, respectively.

12 Claims, 17 Drawing Sheets

(56) References Cited

U.S. PATENT DOCUMENTS

| | | | |
|---|---|---|---|
| 2004/0036696 A1* | 2/2004 | Nair | G09G 5/02 |
| | | | 345/602 |
| 2005/0219147 A1* | 10/2005 | Sato | G06F 3/1431 |
| | | | 345/1.1 |
| 2005/0231526 A1* | 10/2005 | MacInnis | H04N 5/14 |
| | | | 345/592 |
| 2008/0165714 A1* | 7/2008 | Dettinger | H04W 52/0261 |
| | | | 370/311 |
| 2008/0186253 A1* | 8/2008 | Kim | G06F 3/1431 |
| | | | 345/581 |
| 2011/0157181 A1* | 6/2011 | Diard | G09G 5/393 |
| | | | 345/428 |
| 2017/0332116 A1 | 11/2017 | Lee | |
| 2018/0308424 A1* | 10/2018 | Toyoda | G09G 3/3233 |
| 2019/0130875 A1 | 5/2019 | Zhong et al. | |

OTHER PUBLICATIONS

Written Opinion (PCT/ISA/237) dated Sep. 23, 2021 by the International Searching Authority in counterpart International Patent Application No. PCT/KR2021/007732.

* cited by examiner

METHOD AND ELECTRONIC DEVICE FOR DETERMINING DYNAMIC RESOLUTION FOR APPLICATION OF ELECTRONIC DEVICE This is a National Stage of International Application No. PCT/KR2021/007732, filed on Jun. 21, 2021, which claims priority to Indian Patent Application No. 202041030574, filed on Jul. 17, 2020, in the Office of the Controller General of Patents, Designs and Trade Marks (Indian Patent Office), the disclosures of which are incorporated by reference herein in their entireties.

TECHNICAL FIELD

The disclosure relates to image processing, and more specifically to a method and an electronic device for determining a dynamic resolution for an application of the electronic device.

BACKGROUND ART

In general, an electronic device such as a smartphone, a handheld computer, a laptop, a computer, and the like offers a wide range of features, such as communications, computer features, Internet access, music or video playback, viewing of images, etc. The electronic device will often include a display, such as a liquid crystal display (LCD). Displays have been developed to have a high image resolution. The increased resolution creates a more visually enjoyable viewing experience for a user.

Further, the electronic device with the increased resolution display includes more pixels, and will therefore use more energy to create images that are displayed on the display and to drive data to the display. The increased energy consumption will further challenge the supply of energy to the electronic device that is typically battery-powered. Further, the increased energy demand may render the increased resolution display unsuitable for use with the electronic device, as the user may not tolerate the shorter battery life that results. Further, the user may not require the increased resolution display at all times.

DISCLOSURE OF INVENTION

Technical Problem

As shown in FIGS. 1A and 1B, a related electronic device (10) has multiple resolutions settings, but each resolution has its benefits and shortfall. Further, the user of the electronic device (10) manually selects (11) a Wide Quad High Definition (WQHD+) mode (i.e., static resolution for all application) of the electronic device (10), whereas the WQHD+ mode requires more random-access memory (RAM), more battery, increases application launch time of the electronic device (10). Further, the user has to manually decide the resolution settings of the electronic device (10), which decreases user experience. Further, the user of the electronic device (10) may not require static resolution display at all times. For example, a chatting application does not require high resolution at all times. Thus, there has been a demand for an electronic device with variable resolution that may reduce RAM usage, improve application launch time and reduce power consumption with minimal user interaction and optimal user experience.

Further, the user of the electronic device (10) manually selects (12) a default mode (i.e., static resolution for all applications) of the electronic device (10), and the default mode may require less RAM, less battery, comparatively less application launch time. Further, the user of the electronic device (10) may not require static resolution display at all times. For example, a chatting application may not require a high resolution at all times. However, when an increased resolution may be needed when multimedia sent in the chatting application is viewed, for a better user experience. Thus, there has been a demand for an intelligent solution to automatically decide an optimal resolution with minimal user interaction.

One or more embodiments address the above mentioned disadvantages or other shortcomings.

Solution to Problem

According to embodiments of the disclosure, a method for identifying a dynamic resolution for an application of an electronic device includes: identifying, by the electronic device, a base resolution for a window of the application, wherein the window includes a plurality of views; identifying, by the electronic device, a plurality of resolutions respectively corresponding to the plurality of views based on the base resolution and at least one characteristic of each of the plurality of views; applying, by the electronic device, the plurality of resolutions to the plurality of views, respectively; and displaying, by the electronic device, the plurality of views in the plurality of resolutions, respectively.

The identifying the base resolution may include: detecting, by the electronic device, at least one device parameter associated with the electronic device and at least one application parameter associated with the application; and applying, by the electronic device, a machine learning model to identify the base resolution for the window of the application based on the at least one device parameter and the at least one application parameter.

The at least one device parameter may indicate a battery level of the electronic device, a primary memory usage of a primary memory of the electronic device, a secondary memory usage of a secondary memory of the electronic device, a graphics processing unit (GPU) usage of the electronic device, a central processing unit (CPU) usage of the electronic device, a number of applications running in the electronic device, a type of application running in the electronic device, and a mode of display of the electronic device.

The at least one application parameter may include an average usage of the primary memory by the application, an average usage of the secondary memory by the application, a time of usage of the application, a number of times the application is used, a type of content displayed by the application, a category of the application, and a number of graphic components used by the application.

The identifying the plurality of resolutions may include: detecting the at least one characteristic of each of the plurality of views; identifying a first priority for at least one view from among the plurality of views based on the at least one characteristic of the at least one view and the base resolution; and identifying a first dynamic resolution for each of the plurality of views based on the first priority.

The first priority identified for a first view from among the plurality of views may be different than the first priority identified for a second view from among the plurality of views.

The method may further include: dividing, by the electronic device, each of the plurality of views into a plurality of sub-views; detecting, by the electronic device, at least one characteristic of each of the plurality of sub-views; detecting, by the electronic device, based on the at least one characteristic of each of the plurality of sub-views, a first set of sub-views from among the plurality of sub-views that display same content and a second set of sub-views from among the plurality of sub-views that display different content; identifying, by the electronic device, a second priority for the at each of the plurality of sub-views based on the first set of sub-views, the second set of sub-views, and the first dynamic resolution; and identifying, by the electronic device, a second dynamic resolution for each of the plurality of sub-views based on the second priority.

The at least one characteristic of each of the plurality of views may be associated with any one or any combination of a surface view, a texture view, a video view, an image view, a button, a checkbox, a time picker, a date picker, a radio button, a toast, an edit text, and a text view.

The at least one characteristic of each of the plurality of views may be identified based on at least one of an interaction level, a size of view, a location of view on a screen of the electronic device, a z-order of views, a transparency level of view, and a type of content displayed in view.

The applying, by the electronic device, the plurality of resolutions to each of the plurality of views of the window may include any one or any combination of: increasing the base resolution of at least one view from among the plurality of views; decreasing the base resolution of at least one view from among the plurality of views; and maintaining the base resolution of at least one view from among the plurality of views.

According to embodiments of the disclosure, an electronic device for identifying a dynamic resolution for an application includes: a memory; a processor; and a dynamic resolution controller that is operably connected to the memory and the processor, and is configured to: identify a base resolution for a window of the application, wherein the window includes a plurality of views; identify a plurality of resolutions respectively corresponding to the plurality of views based on the base resolution and at least one characteristic of each of the plurality of views; apply the plurality of resolutions to the plurality of views of the window, respectively; and control each of the plurality of views to be displayed in the plurality of resolutions, respectively.

The dynamic resolution controller may be further configured to: detect at least one device parameter associated with the electronic device and at least one application parameter associated with the application; and apply a machine learning model to identify the base resolution based on the at least one device parameter and the at least one application parameter.

The at least one device parameter may indicate a battery level of the electronic device, a primary memory usage of a primary memory of the electronic device, a secondary memory usage of a secondary memory of the electronic device, a graphics processing unit (GPU) usage of the electronic device, a central processing unit (CPU) usage of the electronic device, a number of applications running in the electronic device, a type of application running in the electronic device, and a mode of display of the electronic device.

The at least one application parameter may indicate an average usage of the primary memory by the application, an average usage of the secondary memory by the application, a time of usage of the application, a number of times the application is used, a type of content displayed by the application, a category of the application, and a number of graphic components used by the application.

The dynamic resolution controller may be further configured to: detect the at least one characteristic of each of the plurality of views; identify a first priority for at least one view from among the plurality of views based on the at least one characteristic of the at least one view and the base resolution; and a first dynamic resolution for each of the plurality of views based on the first priority.

The first priority identified for one view from among the plurality of views may be different than the first priority identified for a second view from among the plurality of views.

The dynamic resolution controller may be further configured to: divide each of the plurality of views into a plurality of sub-views; detect at least one characteristic of each of the plurality of sub-views; detect, based on the at least one characteristic of each of the plurality of sub-views, a first set of sub-views from among the plurality of sub-views that display same content and a second set of sub-views from among the plurality of sub-views that display different content; identify a second priority for each of the plurality of sub-views based on the first set of sub-views, the second set of sub-views, and the first dynamic resolution; and identify a second dynamic resolution for each of the plurality of sub-views based on the second priority.

The at least one characteristic of each of the plurality of views may be associated with any one or any combination of a surface view, a texture view, a video view, an image view, a button, a checkbox, a time picker, a date picker, a radio button, a toast, an edit text, and a text view.

The at least one characteristic of each of the plurality of views may be identified based on at least one of an interaction level, a size of view, a location of view on a screen of the electronic device, a z-order of views, a transparency level of view, and a type of content displayed in view.

The dynamic resolution controller may be further configured to: increase the base resolution of at least one view from among the plurality of views; decrease the base resolution of at least one view from among the plurality of views; and maintain the base resolution of at least one view from among the plurality of views.

Advantageous Effects of Invention

One or more embodiments provide a method and an electronic device for determining a dynamic resolution for an application of the electronic device.

One or more embodiments determine a base resolution for a window of the application by using a recurrent neural network (RNN) based artificial intelligence (AI) model, where the window of the application includes a plurality of views.

One or more embodiments determine the base resolution by detecting at least one parameter associated with the electronic device and at least one parameter associated with the application.

One or more embodiments determine the dynamic resolution for each of the views of the window based on the base resolution and at least one characteristic of each of the views.

One or more embodiments divide each of the views into a plurality of sub-views in order to predict desired resolution for each view to save resources of the electronic device without effecting any user experience.

One or more embodiments automatically apply the dynamic resolution to each of the views of the window and display each of the views of the window of the application in the applied dynamic resolution.

BRIEF DESCRIPTION OF DRAWINGS

The above and other aspects, features and advantages of certain embodiments of the present disclosure will be more apparent from the following description taken in conjunction with the accompanying drawings, in which.

MODE FOR THE INVENTION

Figure 1A:
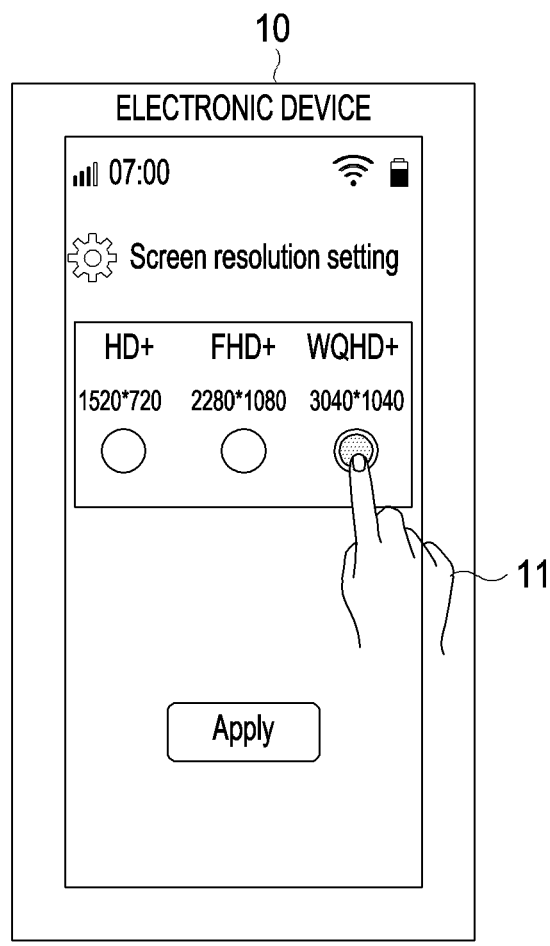
FIGS. 1A and 1B illustrate an electronic device according to related art.
Figure 1B:
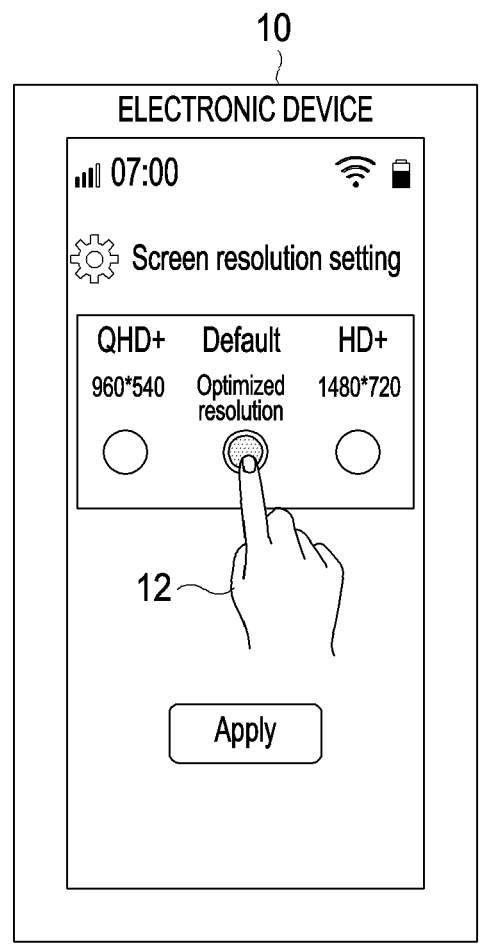

Embodiments are described in greater detail below with reference to the accompanying drawings. In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail. As used herein, the terms "1st" or "first" and "2nd" or "second" may use corresponding component regardless of importance or order and are used to distinguish a component from another without limiting the components. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. The various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the present disclosure. Likewise, the blocks of the embodiments may be physically combined into more complex blocks without departing from the scope of the present disclosure The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a method for determining a dynamic resolution for an application of an electronic device. The method includes determining, by the electronic device, a base resolution for a window of the application, the window of the application includes a plurality of views. Further, the method includes determining, by the electronic device, the dynamic resolution for each of the views of the window based on the base resolution and at least one characteristic of each of the views. Further, the method includes automatically applying, by the electronic device, the dynamic resolution to each of the views of the window. Further, the method includes displaying, by the electronic device, each of the views of the window of the application in the applied dynamic resolution.

Figure 2:
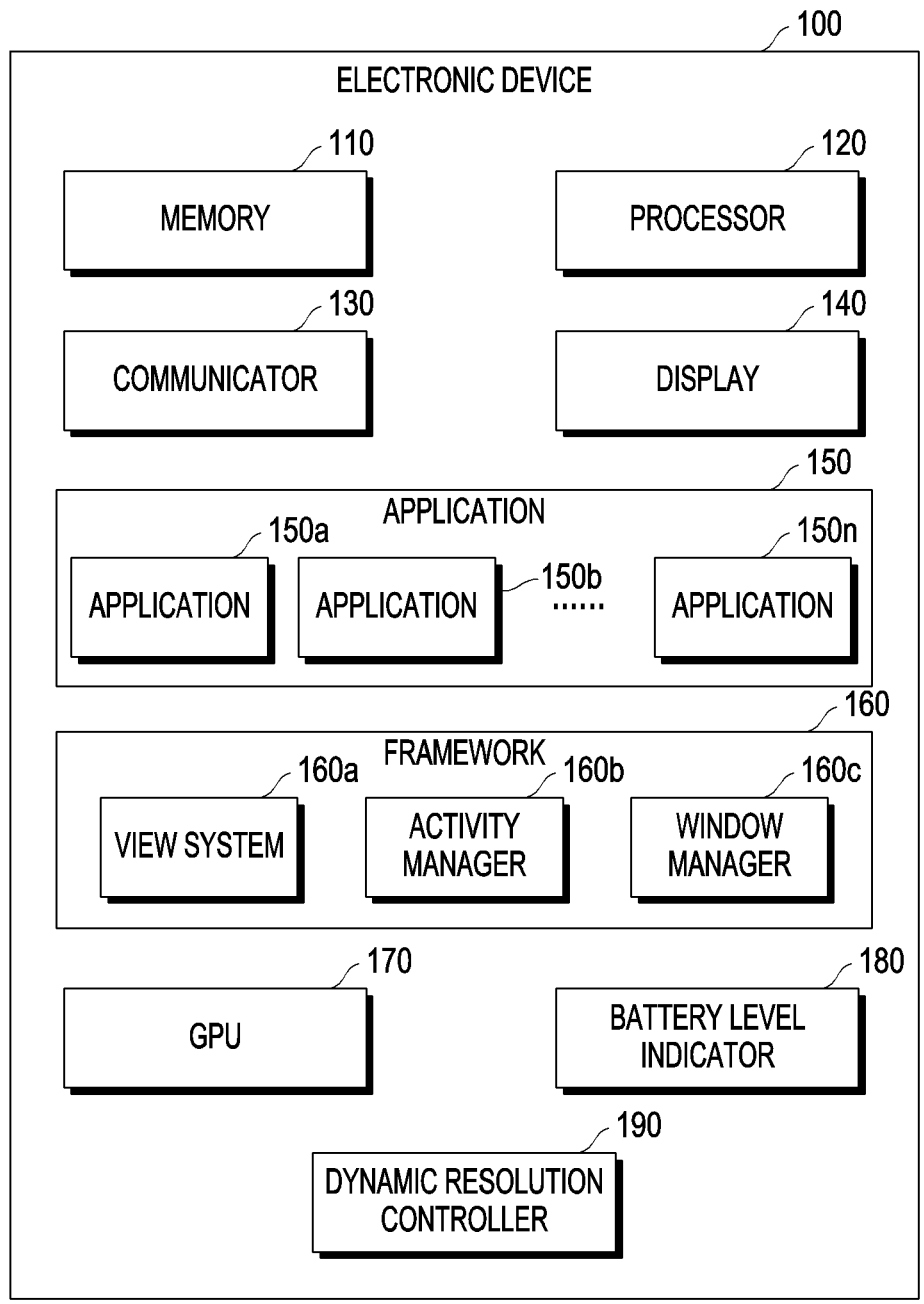
FIG. 2 illustrates a block diagram of an electronic device for determining a dynamic resolution for an application executed in the electronic device, according to an embodiment.

FIG. 2 illustrates a block diagram of an electronic device (100) for determining the dynamic resolution for the application (150) executed in the electronic device (100), according to an embodiment. The electronic device (100) can be, for example, but is not limited to, a smart phone, a laptop, a desktop, a smart watch, a smart TV or the like. In an embodiment, the electronic device (100) includes a memory (110), a processor (120), a communicator (130), a display (140) (i.e., screen), an application (150), a framework (160), a graphics processing unit (GPU) (170), a battery level indicator (180), and a dynamic resolution controller (190).

The memory (110) also stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in Random Access Memory (RAM) or cache). In an embodiment, the memory (110) can be an internal storage unit or it can be an external storage unit of the electronic device (100), a cloud storage, or any other type of external storage. Further, the memory (110) includes a primary memory, and a secondary memory of the electronic device (100).

The processor (120) communicates with the memory (110), a processor (120), the communicator (130), the display (140), the application (150), the framework (160), the GPU (170), the battery level indicator (180), and the dynamic resolution controller (190). The processor (120) is configured to execute instructions stored in the memory (110) and to perform various processes. The communicator (130) is configured for communicating internally between internal hardware components and with external devices via one or more networks.

The application (150) includes a plurality of application 150a to application 150n. Examples for the application 150 include, but are not limited to, a media application, a web application, a video player application, a camera application, a game application, a business application, an education application, a lifestyle application, an entertainment application, a utility application, a travel application, etc.

In an embodiment, the framework (160) includes a view system (160a), an activity manager (160b), and a window manager (160c). Each application (150) requests the framework (160) to inflate its layout for the window being opened. Thus the framework (160) maintains view hierarchy using ViewRootImpl and ViewGroups. The application (150) provides properties for each view like height, width, alpha, content to be shown like text to be shown in TextView, Image to be shown in ImageView, etc.

Further, the view can be categorized into two types: first type of views whose content does not change once set like TextView, ImageView, CheckBox, RadioButton, etc. The application (150) requests the content to be shown and its inflation of view has handled directly by the framework (160). So, the framework (160) always knows the content being set for these views. Further, second type of view has graphical buffers and updates continuously like SurfaceView, TextureView, or VideoView. The application (150) provides graphics buffers to the framework (160) which drawn on canvas (each view has separate canvas). The framework (160) sends a request to the graphics layer (i.e., the GPU (170)) to process the views.

Further, each view passes through three Framework Application Programming Interfaces (APIs) (i.e., layout, measure, and draw). In 'layout' a parent view tells how its children views will appear on the display of the electronic device (100). In 'measure' height and width are calculated according to the values provided by the application (150). In 'draw' graphic buffers are created which are displayed on the screen of the electronic device (100). So, the framework (160) knows every view's size, location, and other properties of the application (150).

Further, the application (150) has some modes that are full screen, split screen, a popup window, or popup view. These can be requested by the application (150) or modified by Framework. So the size of the application window is decided/managed by the window manager (160c) and the activity manager (160b). The battery level indicator (180) indicates a battery level of the electronic device (100).

In an embodiment, the dynamic resolution controller (190) is configured to determine a base resolution for a window of the application (150), the window of the application (150) includes a plurality of views. Further, the dynamic resolution controller (190) is configured to determine the dynamic resolution for each of the views of the window based on the base resolution and at least one characteristic of each of the views. Further, the dynamic resolution controller (190) is configured to automatically apply the dynamic resolution to each of the views of the window. Further, the dynamic resolution controller (190) is configured to display each of the views of the window of the application (150) in the applied dynamic resolution.

Further, the dynamic resolution controller (190) is configured to detect at least one parameter associated with the electronic device (100) and at least one parameter associated with the application (150). The at least one parameter associated with the electronic device (100) includes a battery level of the electronic device (100), a primary memory usage of the electronic device (100), a secondary memory usage of the electronic device (100), a graphics processing unit (GPU (170)) usage of the electronic device (100), a central processing unit (CPU) usage of the electronic device (100), a number of applications (150) running in the electronic device (100), a type of application running in the electronic device (100), and a mode of display of the electronic device (100). The at least one parameter associated with the application (150) includes an average usage of the primary memory by the application (150), an average usage of the secondary memory by the application (150), a time of usage of the application (150), a number of times the application (150) is used, a type of content displayed by the application (150), a category of the application (150), and a number of graphic components used by the application (150).

Further, the dynamic resolution controller (190) is configured to determine the base resolution for the window of the application (150) based on the at least one parameter associated with the electronic device (100) and at least one parameter associated with the application (150) by using a machine learning model (i.e., an ML model controller (190b)).

Further, the dynamic resolution controller (190) is configured to detect at least one characteristic of each of the views of the window. The least one characteristic of each of the views is associated with at least one of a surface view, a texture view, a video view, an image view, a button, a checkbox, a time picker, a date picker, a radio button, a toast, an edit text, and a text view. Further, the least one characteristic of each of the views is determined based on at least one of an interaction level in view, a size of view, a location of view on the screen of the electronic device, a z-order of views, a transparency level of view, and a type of content displayed in the view.

Further, the dynamic resolution controller (190) is configured to determine a priority for at least one view from the plurality of views based on the at least one characteristic of the at least one view and the base resolution. The priority determined for one view from the plurality of view is different than the priority determined for other views from the plurality of view. Further, the dynamic resolution controller (190) is configured to determine the dynamic resolution for each of the views of the window based on the determined priority.

Further, the dynamic resolution controller (190) is configured to divide each of the views into a plurality of sub-views. Further, the dynamic resolution controller (190) is configured to detect at least one characteristic of each of the sub-views. Further, the dynamic resolution controller (190) is configured to detect a set of sub-views from the plurality of sub-views that displays same content based on the at least one characteristic of each of the sub-views and a set of sub-views from the plurality of sub-views that displays different content. Further, the dynamic resolution controller (190) is configured to redetermine a priority for the at least one sub-views based on the set of sub-views that displays same content, the set of sub-views that displays different content, and the determined dynamic resolution. Further, the dynamic resolution controller (190) is configured to redetermine the dynamic resolution for each of the sub-views of the window based on the redetermined priority.

Further, the dynamic resolution controller (190) is configured to automatically apply the dynamic resolution to each of the views of the window including at least one of increasing the base resolution of at least one view from the plurality of views to achieve the dynamic resolution, decreasing the base resolution of at least one view from the plurality of views to achieve the dynamic resolution, or maintaining the base resolution of at least one view from the plurality of views to achieve the dynamic resolution.

At least one of the plurality of modules may be implemented through an AI model. A function associated with AI may be performed through the non-volatile memory, the volatile memory, and the processor (120). The processor (120) may include one or more processors. At this time, one or more processors may be a general-purpose processor, such as a central processing unit (CPU), an application processor (AP), or the like, a graphics-only processing unit such as a graphics processing unit (GPU (170)), a visual processing unit (VPU), and/or an AI-dedicated processor such as a neural processing unit (NPU).

The one or more processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning algorithm to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through a calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to decide or predict. Examples of learning algorithms include, but are not limited to, supervised learning, unsupervised learning, semi-supervised learning, or reinforcement learning.

Although the FIG. 2 shows various hardware components of the electronic device (100) but it is to be understood that other embodiments are not limited thereon. In other embodiments, the electronic device (100) may include less or more number of components. Further, the labels or names of the components are used only for illustrative purpose and do not limit the scope of the present disclosure. One or more components can be combined together to perform same or substantially similar function to determine the dynamic resolution for the application (150) of the electronic device (100).

Figure 3:
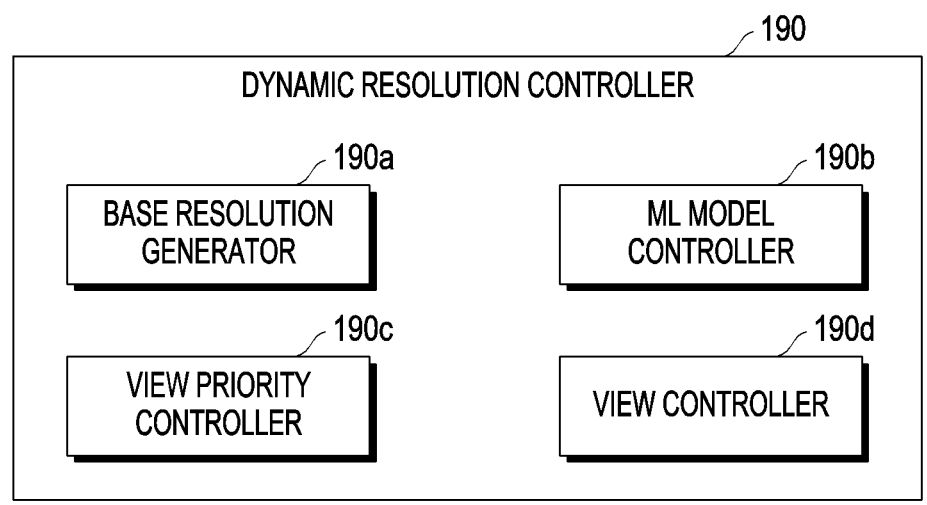
FIG. 3 illustrates a block diagram of a dynamic resolution controller for determining the dynamic resolution for the application executed in the electronic device, according to an embodiment.

FIG. 3 illustrates a block diagram of the dynamic resolution controller (190) for determining the dynamic resolution for the application (150) executed in the electronic device (100), according to an embodiment. In an embodiment, the dynamic resolution controller (190) includes a base resolution generator (190a), an ML model controller (190b), a view priority controller (190c), and a view controller (190d).

In an embodiment, the base resolution generator (190a) determines the base resolution for the window of the application (150). The based resolution calculates based on the at least one parameter associated with the electronic device (100) and the at least one parameter associated with the application (150). Further details on the calculation of the base resolution are provided in the FIG. 5.

In an embodiment, the ML model controller (190b) determines the base resolution for the window of the application (150) based on the at least one parameter associated with the electronic device (100) and at least one parameter associated with the application (150). Further details on the ML model controller (190b) are provided in the FIG. 5.

In an embodiment, the view priority controller (190c) detects the at least one characteristic of each of the views of the window. Further, the view priority controller (190c) determines the priority for the at least one view from the plurality of views based on the at least one characteristic of the at least one view and the base resolution. Further, the view priority controller (190c) determines the dynamic resolution for each of the views of the window based on the determined priority. Further details on the view priority controller (190c) are provided in the FIG. 6.

In an embodiment, the view controller (190d) divides each of the views into the plurality of sub-views. Further, the view controller (190d) detects the at least one characteristic of each of the sub-views. Further, the view controller (190d) detects the set of sub-views from the plurality of sub-views that displays same content based on the at least one characteristic of each of the sub-views and a set of sub-views from the plurality of sub-views that displays different content. Further, the view controller (190*d*) redetermines the priority for the at least one sub-views based on the set of sub-views that displays same content, the set of sub-views that display different content, and the determined dynamic resolution. Further, the view controller (190*d*) redetermines the dynamic resolution for each of the sub-views of the window based on the redetermined priority. Further details on the view controller (190*d*) are provided in the FIG. 7 and FIGS. 8A, 8B and 8C.

Although the FIG. 3 shows various hardware components of the dynamic resolution controller (190) but it is to be understood that other embodiments are not limited thereon. In other embodiments, the dynamic resolution controller (190) may include less or more number of components. Further, the labels or names of the components are used only for illustrative purpose and do not limit the scope of the present disclosure. One or more components can be combined together to perform same or substantially similar function to determine the dynamic resolution for the application (150) of the electronic device (100).

Figure 4A:
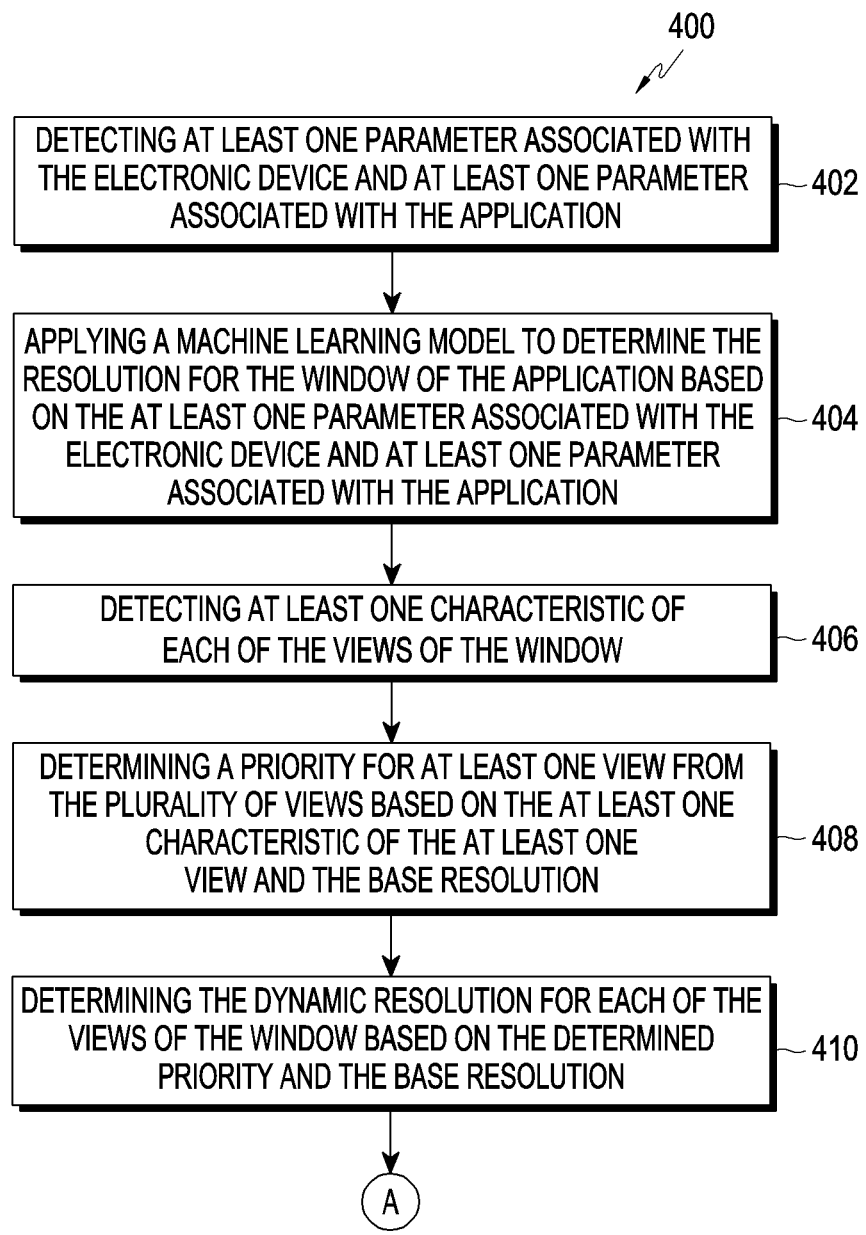
FIGS. 4A and 4B illustrate a flow diagram illustrating various operations for determining the dynamic resolution for the application executed in the electronic device, according to an embodiment.
Figure 4B:
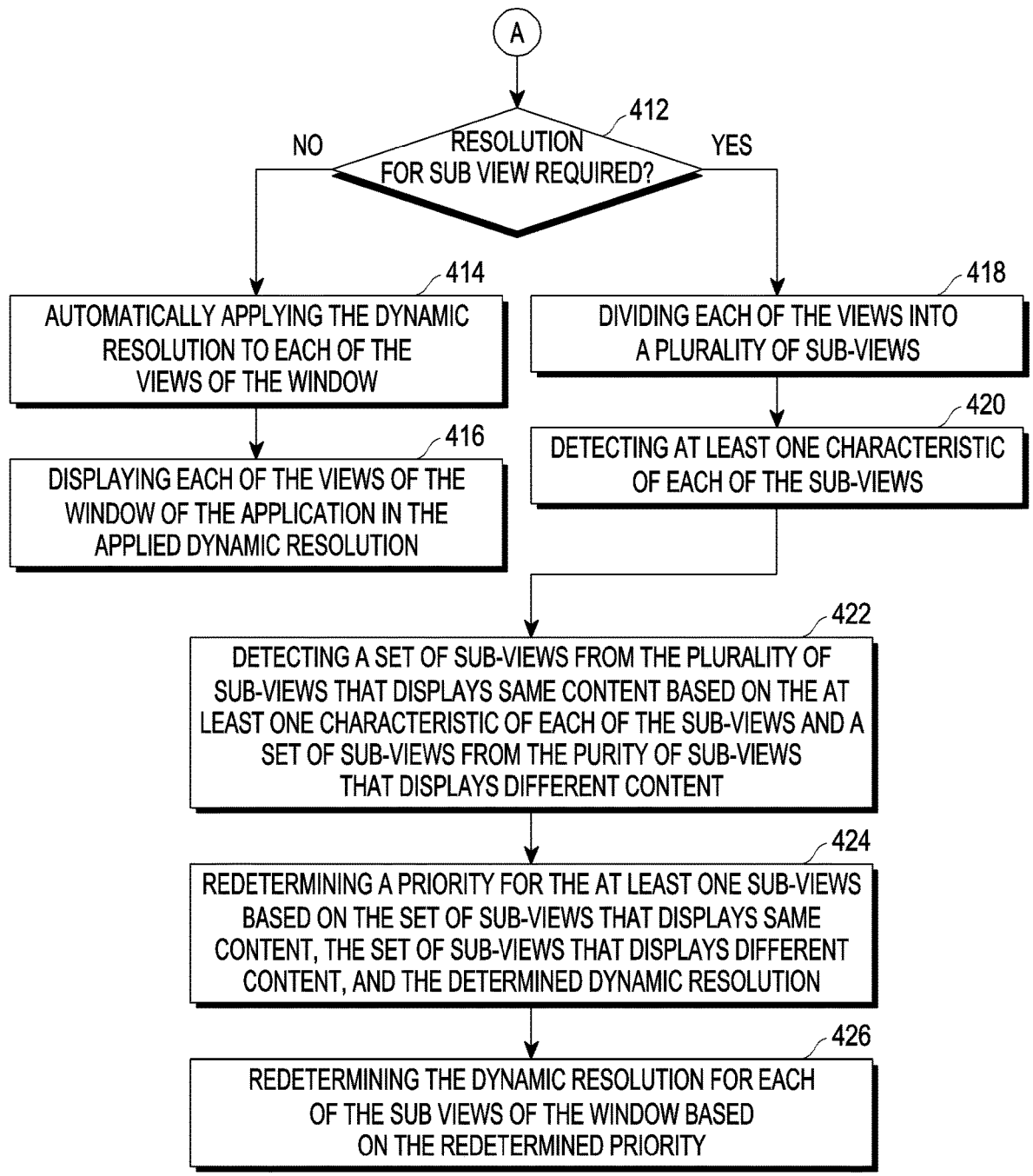

FIGS. 4A and 4B illustrate a flow diagram (400) illustrating various operations for determining the dynamic resolution for the application (150) executed in the electronic device (100), according to an embodiment. The operations (402-426) are performed by the electronic device (100).

At 402, the method includes detecting at least one parameter associated with the electronic device (100) and at least one parameter associated with the application (150). At 404, the method includes applying the machine learning model to determine the base resolution for the window of the application (150) based on the at least one parameter associated with the electronic device (100) and at least one parameter associated with the application (150). At 406, the method includes detecting at least one characteristic of each of the views of the window. At 408, the method includes determining the priority for at least one view from the plurality of views based on the at least one characteristic of the at least one view and the base resolution. At 410, the method includes determining the dynamic resolution for each of the views of the window based on the determined priority and the base resolution.

At 412, the method includes determining whether resolution for sub-views is required or not required. At 414, the method includes automatically applying the dynamic resolution to each of the views of the window in response to determining that resolution for sub-view is not required. At 416, the method includes displaying each of the views of the window of the application in the applied dynamic resolution. At 418, the method includes dividing each of the views into the plurality of sub-views in response to determining that resolution for sub-view is required. At 420, the method includes detecting at least one characteristic of each of the sub-views. At 422, the method includes detecting the set of sub-views from the plurality of sub-views that displays same content based on the at least one characteristic of each of the sub-views and the set of sub-views from the plurality of sub-views that displays different content. At 424, the method includes redetermining the priority for the at least one sub-views based on the set of sub-views that displays same content, the set of sub-views that display different content, and the determined dynamic resolution. At 426, the method includes redetermining the dynamic resolution for each of the sub-views of the window based on the redetermined priority.

Figure 5:
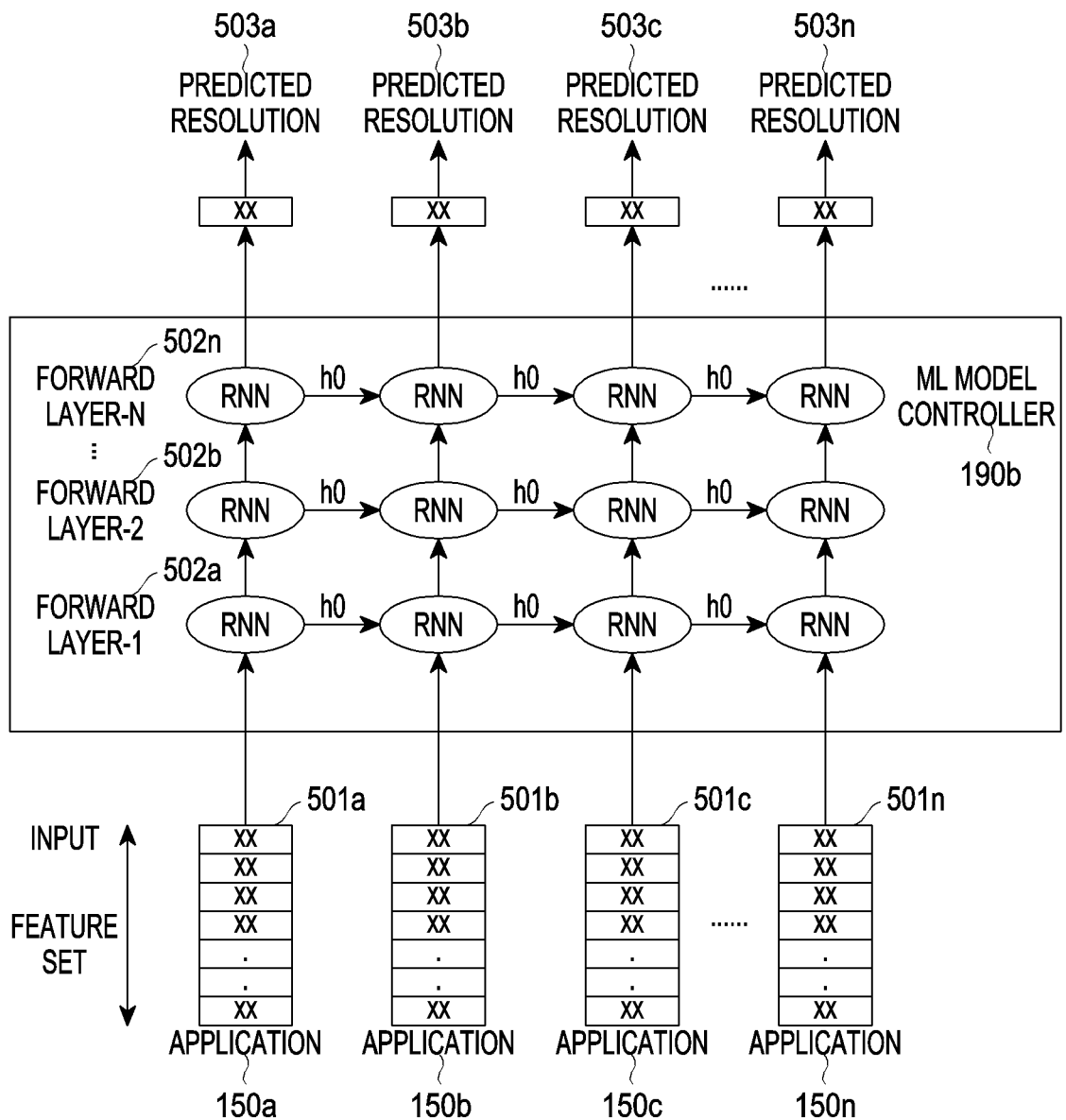
FIG. 5 illustrates a schematic view of a machine learning model to determine a base resolution for a window of the application based on at least one parameter associated with the electronic device and at least one parameter associated with the application, according to an embodiment.

FIG. 5 illustrates a schematic view of the machine learning model (i.e., ML model controller (190*b*)) to determine the base resolution for the window executed in the application (150) based on at least one parameter associated with the electronic device (100) and at least one parameter associated with the application (150), according to an embodiment.

The proposed method uses RNN-based intelligent recognition system (i.e., ML model controller (190*b*)) which uses feature sets (501*a*-501*n*) (i.e., system-dependent features as well as application dependent features) to predict resolutions (503*a*-503*n*) of the application (150*a*-150*n*). The different feature sets (501*a*-501*n*) applies to different layer (502*a*-502*n*) of the ML model controller (190*b*) and predict resolutions (503*a*-503*n*) of the application (150*a*-150*n*). The predicted resolutions (503*a*-503*n*) are calculated based upon current input state, previous input and previous output state and predict which resolution will increases user's experience at runtime without harming the electronic device (100) performance. The proposed dynamic resolution solution method/system intelligently learns user's preferences with every interaction and applies those learnings to next interaction.

The ML model controller (190*b*) predicts the base resolution values from the current input and previous output. The base resolution for the window of the application (150) is calculated by:

$$\text{Base Resolution } (BR) = \qquad [\text{Math.1}]$$
$$\left(\sum \text{Content Priority}\right) \times RRC \times \text{App Size} + \sum \text{External Factors}$$

$$\text{Content Priority: } \frac{\text{Content Size}}{\text{ScreenSize}} \times \frac{1}{100} \qquad [\text{Math.2}]$$

$$\text{External Factor} = \qquad [\text{Math.3}]$$
$$\frac{\text{App Open Count}}{\text{Total Count}} + \frac{\text{Time Spent on App}}{\text{Total time spent}}$$

Furthermore, Table.1 shows priority calculations for the parameter, such as content type, application size and the RAM required coefficient (RRC) shown below:

TABLE 1

| Parameter | | Priority |
|---|---|---|
| Type of content | | |
| Textual | | $2^1$ |
| Image | | $2^2$ |
| Video | | $2^3$ |
| Application Size | | |
| PIP (Picture in Picture) | 10% | 0.1 |
| Split (MultiWindow) | 25% | 0.25 |
| | 50% | 0.5 |
| | 75% | 0.75 |
| FullScreen | 100% | 1 |
| RAM required coefficient (Graphics memory): RRC | | |
| Light | 0~200 MB | $2^1$ |
| Moderate | 200~500 MB | $2^2$ |
| Heavy | >500 MB | $2^3$ |

Furthermore, Table.2 shows based on the based resolution value the resolution of the window of the application (150) is decided shown below,

TABLE 2

| BR Value | Resolution |
|---|---|
| 0~8 | SD+ |
| 8~18 | HD+ |
| 18~28 | FHD+ |
| 28+ | WQHD+ |

Furthermore, Table. 3 shows various parameters to predict the base window resolution using the ML model controller (190b) shown below,

TABLE 3

| Feature set | App-1 | App-2 | App-3 |
|---|---|---|---|
| System dependent features | | | |
| Battery left | BL1 | BL2 | BL3 |
| Remaining RAM | RR1 | RR2 | RR3 |
| Currently GPU usage | GPU1 | GPU2 | GPU3 |
| Application usage count | AU1 | AU2 | AU3 |
| Application type | AT1 | AT2 | AT3 |
| Application dependent features | | | |
| Average RAM usage | AR1 | AR2 | AR3 |
| Average battery usage | AB1 | AB2 | AB3 |
| Time of usage | TU1 | TU2 | TU3 |
| Content of screen | CS1 | CS2 | CS3 |
| Graphical component | GC1 | GC2 | GC3 |

Example of the type of application like a payment application, a social media application, etc. the payment application requires a high level of authentication, and a high level of responsiveness is required for the social media application. Further, an example of a content screen like a PIP mode, a split window, etc. Further, an example of a graphical component like a surface view, a texture view, etc.

In an embodiment, predicated base resolution give as input to the view priority controller (190c) to determine the priority for at least one view from the plurality of views.

Further, related systems and methods manually select the base resolution. Every user of the electronic device (100) is not attentive to select the base resolution. Further, selecting resolution for each application (150) is cumbersome, which reduces user experience and increases interactions. The user of the electronic device (100) wants a good experience with minimal interactions. So, the proposed solution uses RNN based AI model to predict the base resolution for each window based upon not only current but previously learnt system, application (150) and user interaction features.

Further, the same base resolution is not required every time. For example, watching a video in a portrait mode requires only 25% video view and a landscape mode requires full screen video view. So, manual selection for video application uses same resolution in both modes whereas in the proposed solution for video application's base resolution kept intelligently as FHD in portrait mode and WQHD in landscape mode without compromising user experience.

Further, for newly installed application (150), the user of the electronic device (100) needs to manually select the base resolution for the newly installed application (150), which decreases user's experience whereas the proposed solution using RNN model checks the user's current state and previous state and decide the resolution and/or put that data into database for future predictions.

Figure 6:
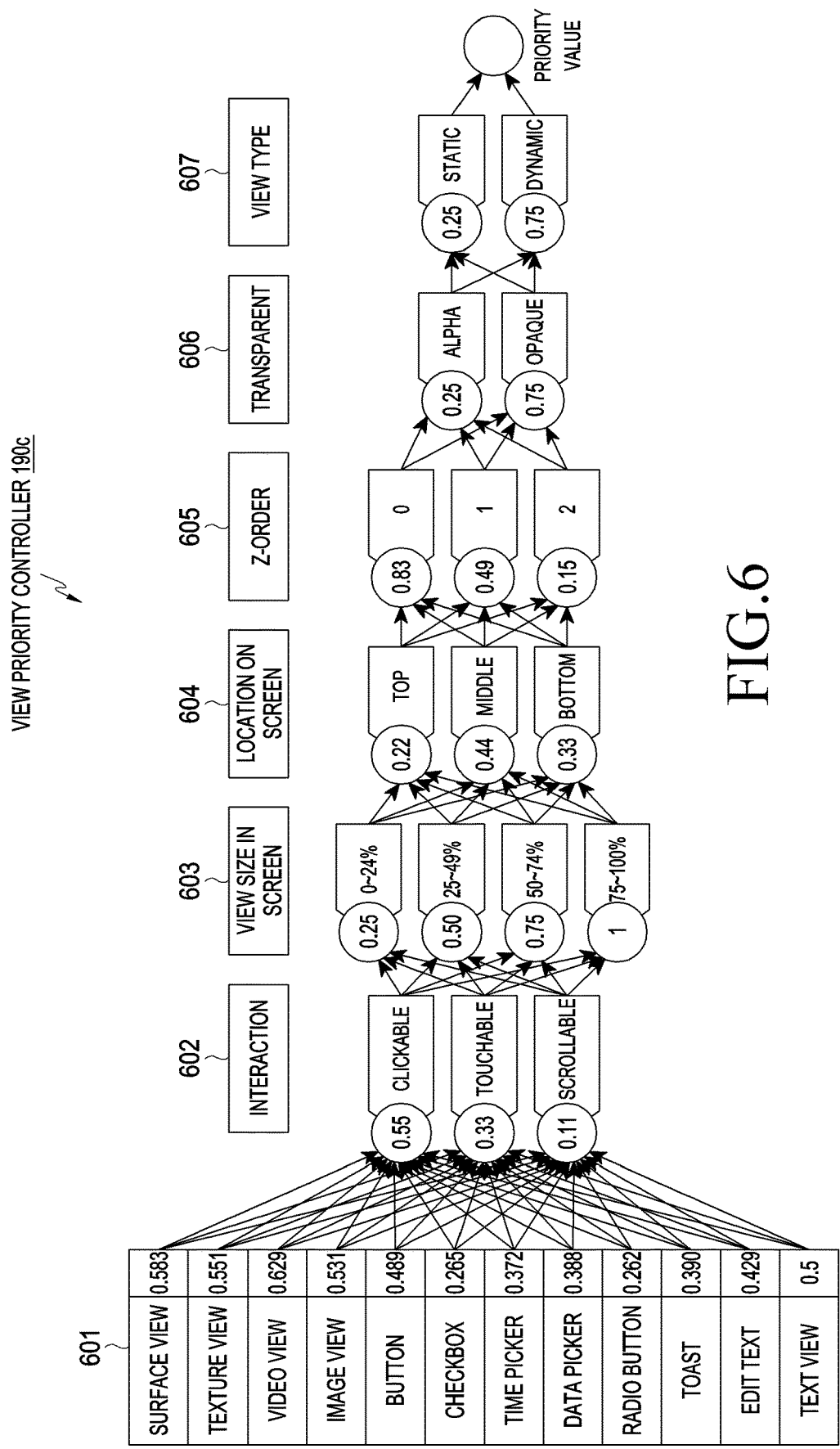
FIG. 6 illustrates a schematic view of a view priority controller to determine a priority for at least one view from a plurality of views based on at least one characteristic of the at least one view and the base resolution, according to an embodiment.

FIG. 6 illustrates a schematic view of the view priority controller (190c) to determine the priority for at least one view from the plurality of views based on at least one characteristic of the at least one view and the base resolution, according to an embodiment.

The view priority controller (190c) detects the at least one characteristic of each of the views of the window by interacting with the framework (160). The least one characteristic (601) of each of the views is associated with at least one of the surface view, the texture view, the video view, the image view, the button, the checkbox, the time picker, the date picker, the radio button, the toast, the edit text, and the text view. Further, the at least one characteristic of each of the views is determined based on (602-607) at least one of the interaction level in view, the size of view, the location of view on screen of the electronic device (100), the z-order of views, the transparency level of view, and the type of content displayed in view. Further, the view priority controller (190c) determines the priority for at least one view from the plurality of views based on the at least one characteristic of the at least one view and the base resolution. Further, the view priority controller (190c) determines the dynamic resolution for each of the views of the window based on the determined priority.

Furthermore, the framework (160) has complete information on each parameter (602-607) (e.g., interaction level in view, the size of view, the location of view on screen, z-order of views, transparency level of view, content type/view type) as shown in Table. 4, and based on the parameters the view priority controller (190c) calculates priority of the view.

TABLE 4

| Parameters | Processing for parameters |
|---|---|
| Interaction (602) | Application (150) register callback for touch, click, and scroll to framework (160) |
| View size in screen (603) | Framework (160) calculates view size during measure and layout API according to property given by application (150) |
| Location on screen (604) | Framework (160) calculates view size during measure and layout API according to view hierarchy of application (150) |
| z-order (605) | At same location multiple views can draw, so top view has higher priority |
| Transparency (606) | Application (150) sets alpha value to give transparency to the view |
| Content type (607) | Different priority value for static view (e.g., button, toast, edit text) and dynamic view (e.g., videoview, textureview) |

The priority value for the at least one view from the plurality of views is calculated by, $$ViewPriority x = \frac{1}{n}\left(\sum_{i=1}^{m} CFi\right) \qquad \text{[Math. 4]}$$

Where n is a count of view parameters, and CF is a coefficient factor.

$$TPx = MPx = LPx = \tfrac{1}{3}(VC) \qquad \text{[Math. 5]}$$

Where TP is an array of top priority views, MP is an array of medium priority views, LP is an array of low priority views, and VC is view count in layout (received from the application (150) rendering request).

Furthermore, one-third of top and one-third of bottom views from view-priority array stored in TP and LP array, and remaining views will be stored in MP array. High priority view's resolution will be improved, low priority view's resolution is reduced and medium priority view's resolution is same as the base resolution, $$\text{Resolution}(TPx)=BR+1 \quad \text{[Math. 6]}$$

$$\text{Resolution}(LPx)=BR-1 \quad \text{[Math. 7]}$$

$$\text{Resolution}(MPx)=BR \quad \text{[Math. 8]}$$

These dynamic resolutions will improve in the user viewing experience and saves RAM and battery of the electronic device (100). The array of views of new resolution passes to the framework (160) and the view priority controller (190c) applies the dynamic resolution to each of the views of the window. Further, the priority controller (190c) displays each of the views of the window of the application (150) in the applied dynamic resolution.

Further, related systems and methods use static information without using factors (601-607), whereas the proposed solution uses the view priority controller (190c) which works to identify priority of the view, where a high priority view will have high resolution, and a low priority view will have low resolution. The proposed solution takes various factors (601-607) which are decided on runtime while opening the application (150) and not always static information. So, deciding resolution based on the priority of the view improves user viewing experience.

Figure 7:
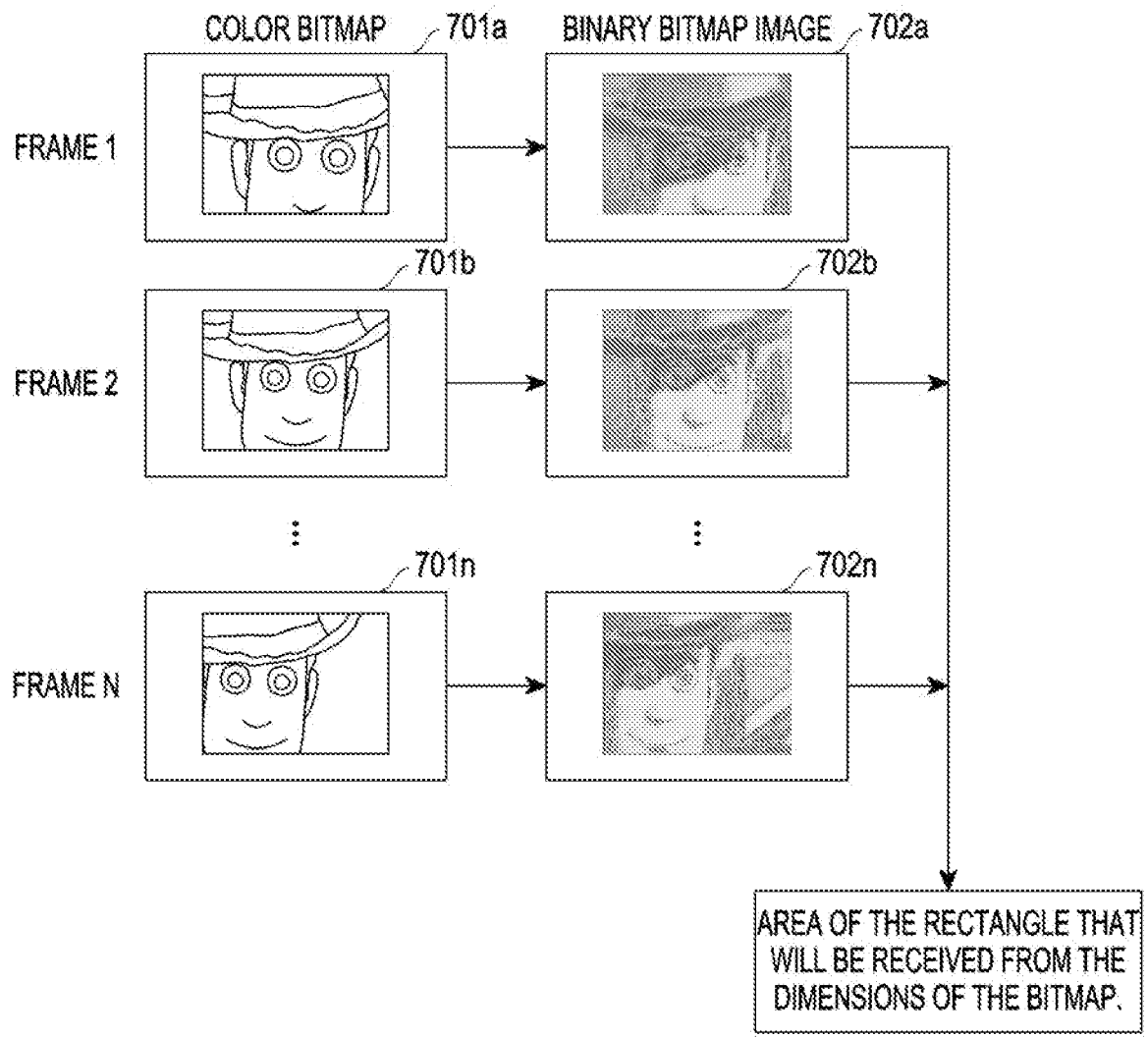
FIG. 7 is an example scenario in which the electronic device detects a set of sub-views from a plurality of sub-views that displays same content based on at least one characteristic of each of the sub-views and a set of sub-views from the plurality of sub-views that displays different content, according to an embodiment.

FIG. 7 is an example scenario in which the electronic device (100) detects the set of sub-views from the plurality of sub-views that displays same content based on at least one characteristic of each of the sub-views and the set of sub-views from the plurality of sub-views that displays different content, according to an embodiment.

The view controller (190d) recalculates possibilities of bigger views to divide into sub-views. The view controller (190d) captures 'n' frames (701a-701n) from the calculation. The number of captured frames 'n' is calculated based upon refresh rate, or frames per second, which varies from 60 frames to 120 frames per second, (No. of frames rendered per second/2). Further, the view controller (190d) converts captured frames into a binary image (702a-702n). Further, the view controller (190d) identifies a consistent non-black region over a time-period "t". Further, the view controller (190d) returns cropped region, where an actual visible region is less than 80% of selected view. The cropped region segregates solid colors and vibrant colors to identify a color co-relation and identify descriptor content area. Further, the cropped region improves resolution of mainframe and decreases resolution of remaining area of the window of the application (150), which saves battery consumption and RAM of the electronic device (100).

Further, the view controller (190d) requests the GPU (170) to obtain a difference between adjacent pixel values. If the difference between adjacent pixel values is greater than a threshold and similar differences are found across row and column of pixels then it is treated as a boundary, the difference between adjacent pixel values calculated by, $$\text{Resolution decision: } (\text{Pixel}_i - \text{Pixel}_j) \leq \text{Threshold} \ni \text{Threshold} \in [0,255] \quad \text{[Math. 9]}$$

Now, whereas sub-views that have the same values for all points means they can be replaced by solid color and whereas sub-views that have different values for each point means, showing actual multimedia content (e.g., main content/mainframe).

Figure 8A:
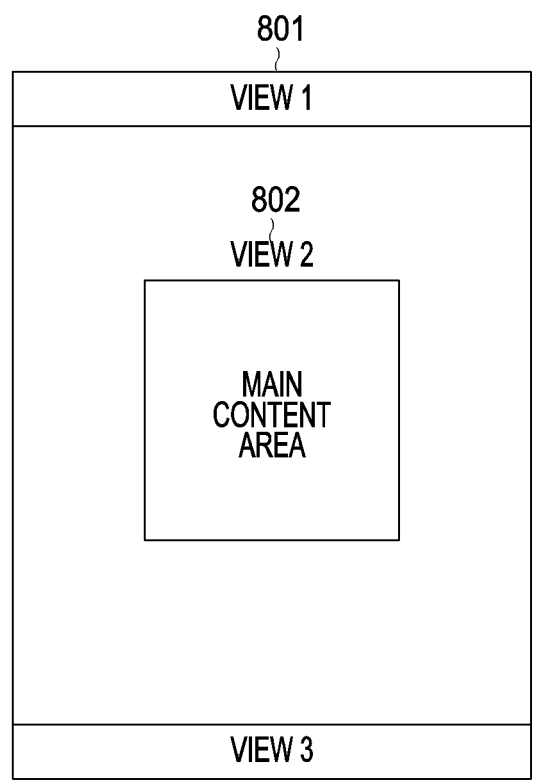
FIGS. 8A, 8B and 8C illustrate a method used to determine boundaries and main content of the window of the application, according to an embodiment.
Figure 8B:
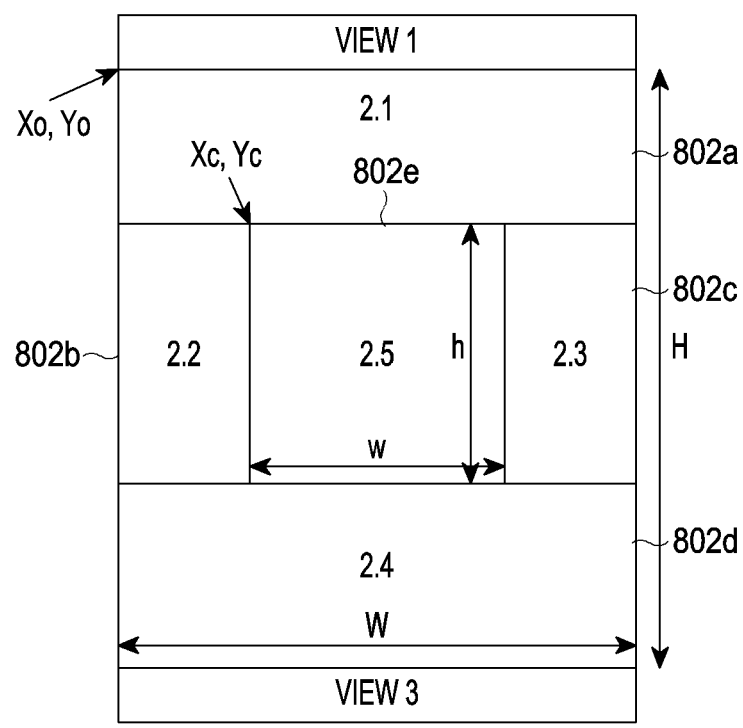
Figure 8C:
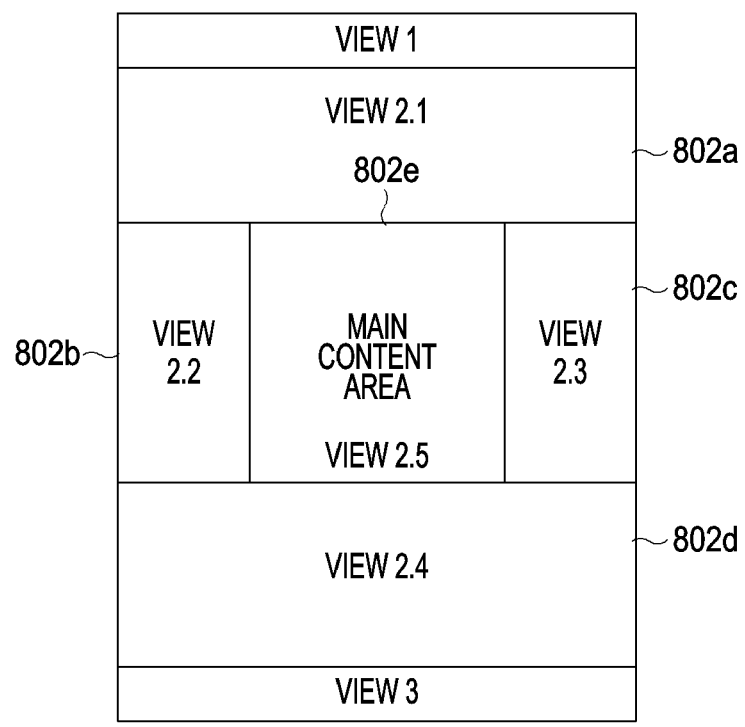

FIGS. 8A, 8B and 8C illustrate a method used to determine boundaries and main content of the window of the application (150), according to an embodiment.

Referring to FIG. 8A: an original window (801) (i.e., with known original view coordinates (Xo, Yo, H, W)) of the application (150). The view controller (190d) identifies the mainframe of the window of the application (150). Furthermore, the mainframe is indicating by a "view-2" (802) of the window of the application (150). The notation "b" indicates that the view-2 (802) of the window of the application (150) is subdivided into five-different views (802a-802e). As the view controller (190d) identifies the mainframe (802e) with coordinates (Xc, Yc, h, w) and calculates each of the sub-views coordinated based on known original view (801) coordinates and the mainframe (802e) with coordinates. Where (Xo, Yo,) represents starting point of the original window (801), (Xc, Yc) represents starting points of mainframe (802e), (H, W) represents height, width of the original window (801), (h, w) represents height, width of the mainframe (802e).

A view 2.1 (802a) is defined by starting points (Xo, Yo), height (Yc−Yo), and width (W). Further, a view 2.2 (802b) is defined by starting points (Xo, Yc), height (h), and width (Xc−Xo). Further, a view 2.3 (802c) is defined by starting points (Xc+w, Yc), height (h), and width (W−w−(Xc−Xo)). Further, a view 2.4 (802d) is defined by starting points (Xo, Yc+h), height (H−h−(Yc−Yo), and width (w). Further, a view 2.5 (802e) is defined by starting points (Xc, Yc), height (h), and width (w).

The notation "c" indicates that the view controller (190d) divides each of the views into the plurality of sub-views (802a-802e). Further, the view controller (190d) detects the at least one characteristic of each of the sub-views (802a-802e). Further, the view controller (190d) detects the set of sub-views from the plurality of sub-views (802a-802e) that displays same content based on the at least one characteristic of each of the sub-views and the set of sub-views from the plurality of sub-views (802a-802e) that displays different content. Further, the view controller (190d) redetermines the priority for the at least one sub-views based on the set of sub-views that displays same content, the set of sub-views that display different content, and the determined dynamic resolution. Further, the view controller (190d) redetermines the dynamic resolution for each of the sub-views (802a-802e) of the window based on the redetermined priority.

In an embodiment, the view controller (190d) divides original window into any number of sub-views depending upon boundaries detected.

Figure 9A:
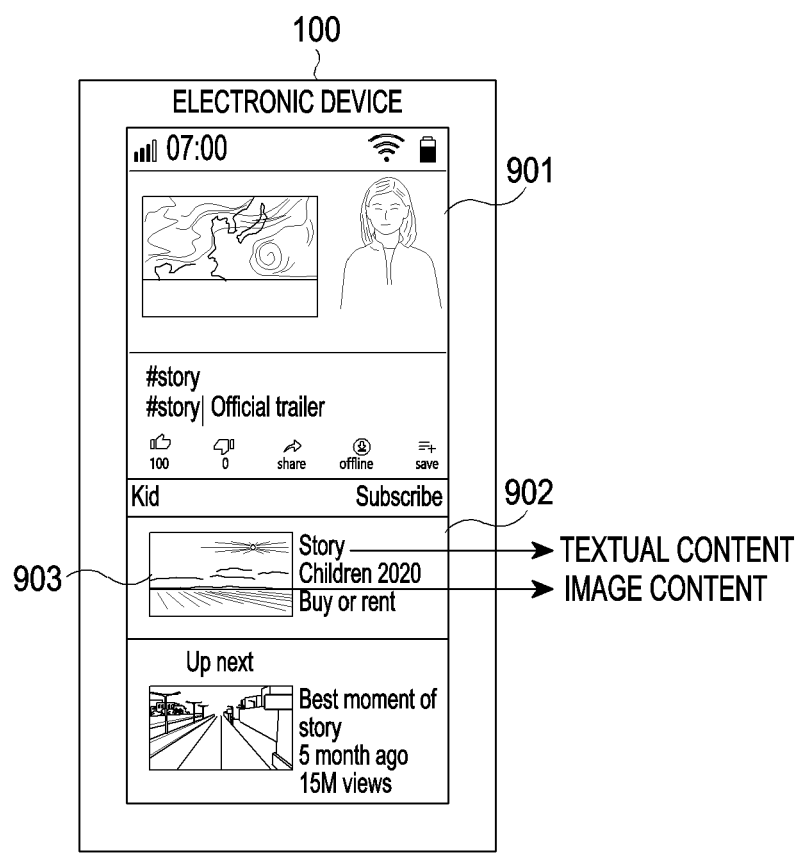
FIGS. 9A, 9B and 9C illustrate an example scenario in which the electronic device determines the dynamic resolution for the application executed in the electronic device, according to an embodiment.
Figure 9B:
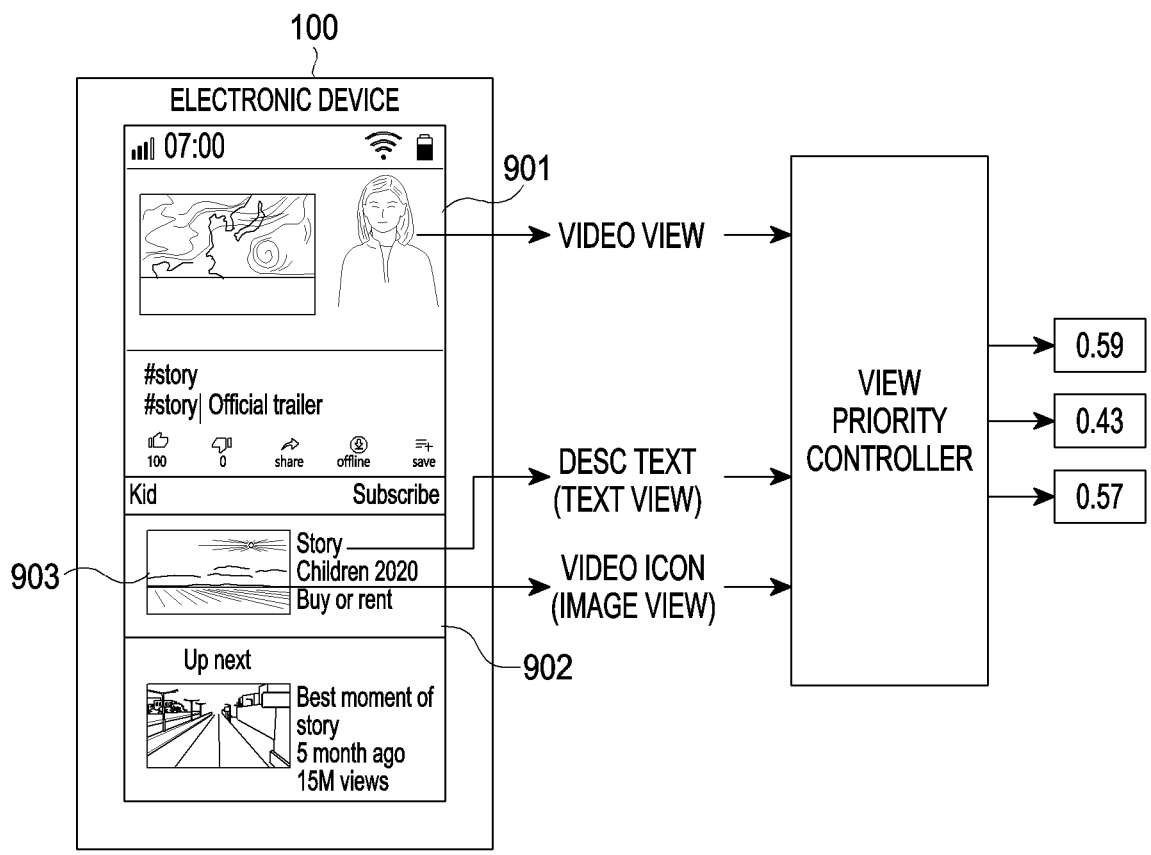
Figure 9C:
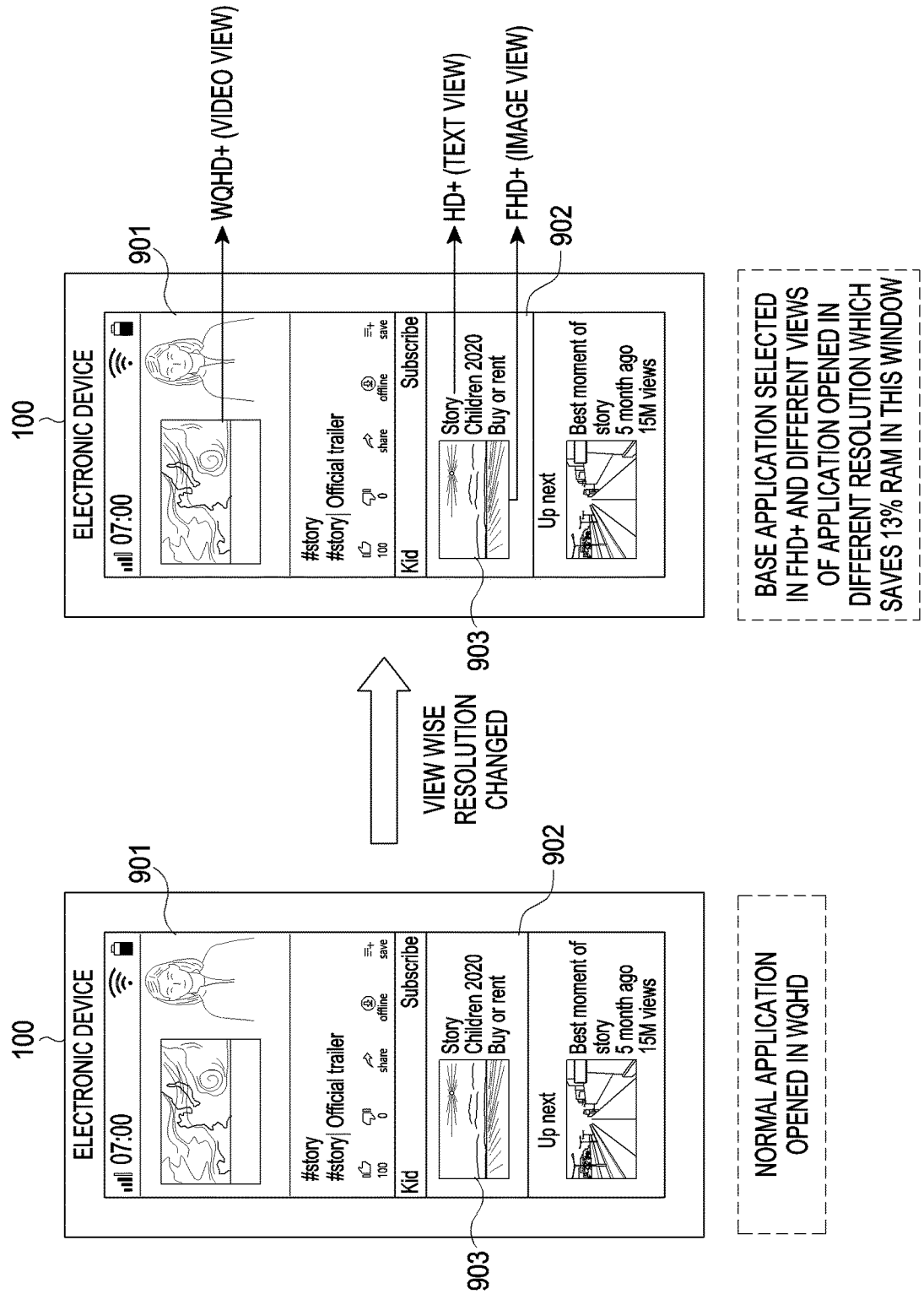

FIGS. 9A, 9B and 9C illustrate an example scenario in which the electronic device (100) determines the dynamic resolution for the on the redetermined priority of an application of the electronic device (100), according to an embodiment.

Referring to FIG. 9A: the base resolution generator (190a) determines the base resolution for the window of the application (150) (e.g., video application) as per equation "(1-3)", the window of the application (150) includes the plurality of views (e.g., video content (901), textual content (902), and image content (903)). Furthermore, Table.5 shows priority calculations for the parameter, such as content type, application size and the RRC shown below:

TABLE 5

| Parameter | Priority | Value |
|---|---|---|
| Type of content | | |
| Textual - 30% | 2^1 | 0.6 |
| Image - 35% | 2^2 | 1.4 |
| Video - 33% | 2^3 | 2.64 |
| Application Size | | |
| FullScreen 100% | 1 | 1 |
| RAM required coefficient (Graphics memory) | | |
| Moderate 200~500 MB | 2^2 | 4 |

As per the equation-1, the calculation of BR is given below, BR=(2.64+1.4+0.6)×4×1+(1/27+12/72), BR=4.64×4+0.20=18.76.

As the BR value is 18.76, according to Table. 2, the base resolution for the window of the application (150) is FHD+ (i.e., the base resolution is determined by using ML model controller (190$b$)).

Referring to FIG. 9B: the base resolution of the window of the application (150) is passed to the view priority controller (190$c$). The view priority controller (190$c$) calculates the priority value of each view (901-903) shown on the window (i.e., Array of all views has received from the framework (160)). The view's priority calculation is explained below in Table. 6.

TABLE 6

| Views | view priority | View interaction | View size | Location on screen | Z-Order | Transparency | Content Type | Priority Value |
|---|---|---|---|---|---|---|---|---|
| Video View | 0.629 | 0.44 | 0.5 | 0.22 | 0.83 | 0.75 | 0.75 | 0.59 |
| Desc Icon (Button) | 0.489 | 0.55 | 0.25 | 0.44 | 0.83 | 0.75 | 0.25 | 0.51 |
| Desc Text (TextView) | 0.5 | 0 | 0.25 | 0.44 | 0.83 | 0.75 | 0.25 | 0.43 |

Referring to FIG. 9C: the view wise resolution selection. The view priority controller (190$c$) calculates the total view count as per the equation-5 and determines the priority (i.e., TP, LP, and MP) for the video view (901), text view (902), and image view (903) as per the equations 6-8. Resolution of the each view (901-903) is predicted based on the priority. The predicted resolution view's array passed to the framework (160) to draw on the screen of the electronic device (100). In the given example, the video view (901) has a top priority (TP) and resolution for the video view (901) is WQHD+. Further, the text view (902) has a low priority (LP) and resolution for the text view (902) is HD+. Further, the image view (903) has a medium priority (MP) and resolution for the image view (903) is FHD+.

Figure 10A:
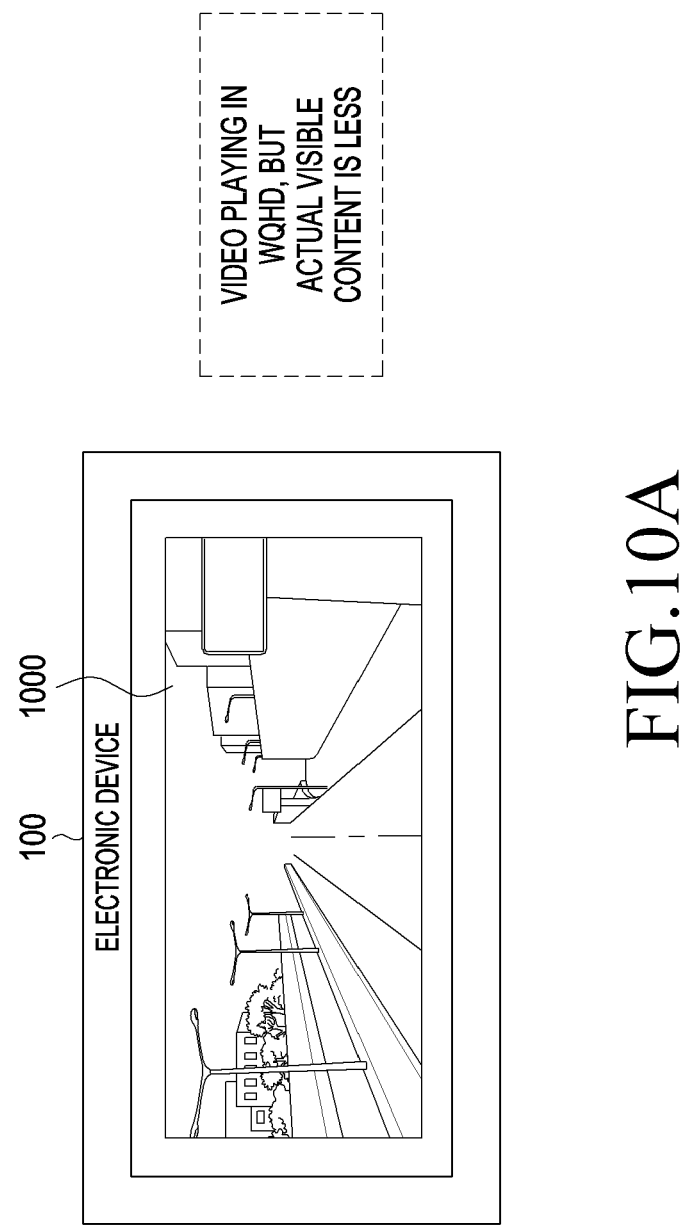
FIGS. 10A and 10B illustrate an example scenario in which the electronic device determines boundaries and main content of the window executed in the application, according to an embodiment.
Figure 10B:
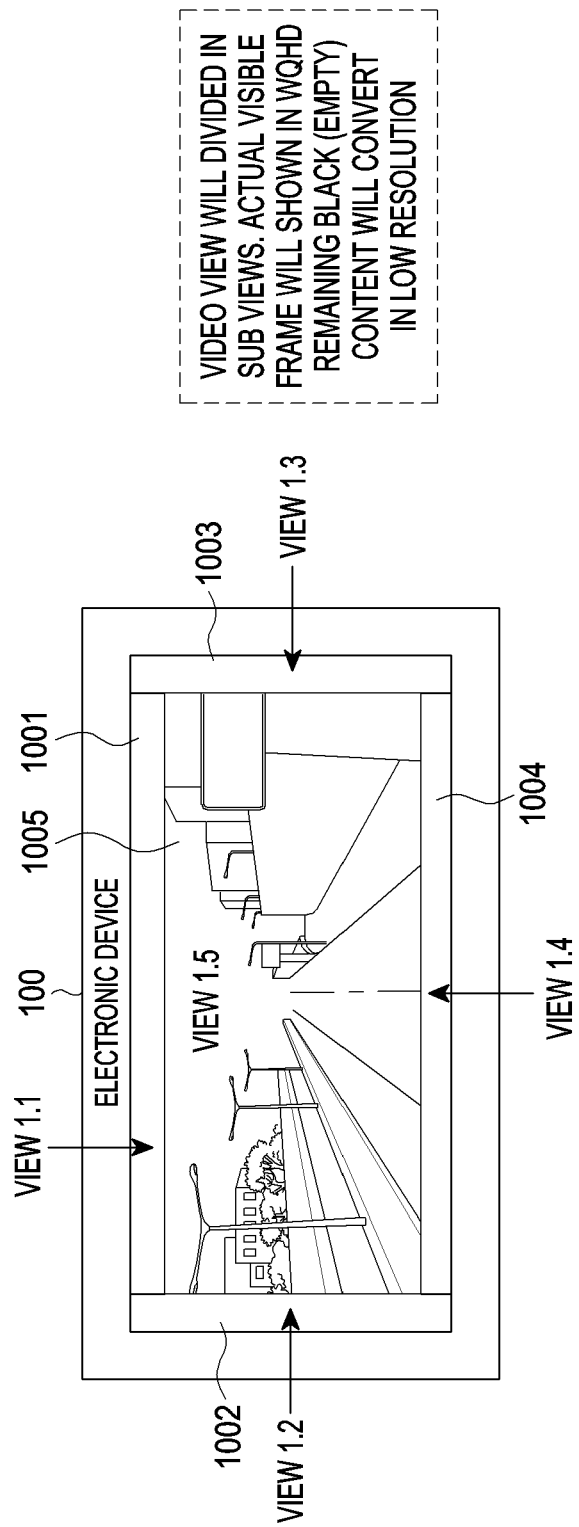

FIGS. 10A and 10B illustrate an example scenario in which the electronic device (100) determines boundaries and main content of the window of the application (150), according to an embodiment.

Referring to FIG. 10A: the user of the electronic device (100) is playing a video, the video (1000) is playing in WQHD+, and full-screen resolution of the electronic device (100) is in WQHD+, which requires more RAM and battery of the electronic device (100). Referring to FIG. 10B: the proposed method divides video view into the plurality of sub-view The proposed method calculates resolution of individual views and then further attempts to sub-divide views into smaller views (1001-1005) using the view controller (190$d$) and further obtains different resolutions for the sub-views. This way the sub-views which have main content (1005) is given same resolution that was predicted for whole view and other sub-views (1001-1004) are given lower resolution by the view priority controller (190$c$) thereby saving RAM, reducing Power consumption of the electronic device (100). Actual visible frame (1005) shows in WQHD+ and remaining black (empty) content (1001-1004) converts into low resolution. The view wise resolution is given in the Table. 7.

TABLE 7

| Views | Resolution predicted |
|---|---|
| View 1.1 (1001) | HD+ |
| View 1.2 (1002) | HD+ |
| View 1.3 (1003) | HD+ |
| View 1.4 (1004) | HD+ |
| View 1.5 (1005) | WQHD+ |

The embodiments disclosed herein can be implemented using at least one software program running on at least one hardware device and performing network management functions to control the elements.

While embodiments have been particularly shown and described, it will be understood that various changes in form and details may be made therein without departing from the spirit and scope of the following claims.

The invention claimed is:

1. A method for identifying a dynamic resolution for an application of an electronic device, the method comprising:
   identifying, by the electronic device, a base resolution for a window of the application, wherein the window comprises a plurality of views;
   identifying, by the electronic device, a plurality of resolutions respectively corresponding to the plurality of views based on the base resolution and at least one characteristic of each of the plurality of views;
   applying, by the electronic device, the plurality of resolutions to the plurality of views, respectively; and
   displaying, by the electronic device, the plurality of views in the plurality of resolutions, respectively,
   wherein the method further comprises:
   dividing, by the electronic device, each of the plurality of views into a plurality of sub-views;
   detecting, by the electronic device, at least one characteristic of each of the plurality of sub-views;
   detecting, by the electronic device, based on the at least one characteristic of each of the plurality of sub-views, a first set of sub-views from among the plurality of sub-views that display same content and a second set of sub-views from among the plurality of sub-views that display different content;

identifying, by the electronic device, a priority for each of the plurality of sub-views based on the first set of sub-views, the second set of sub-views, and a dynamic resolution for each of the plurality of views; and identifying, by the electronic device, a dynamic resolution for each of the plurality of sub-views based on the priority for each of the plurality of sub-views.

2. The method as claimed in claim 1, wherein the identifying the base resolution comprises:

detecting, by the electronic device, at least one device parameter associated with the electronic device and at least one application parameter associated with the application; and applying, by the electronic device, a machine learning model to identify the base resolution for the window of the application based on the at least one device parameter and the at least one application parameter.

3. The method as claimed in claim 1, wherein the identifying the plurality of resolutions comprises:

detecting the at least one characteristic of each of the plurality of views;

identifying a priority for at least one view from among the plurality of views based on the at least one characteristic of the at least one view and the base resolution; and identifying a dynamic resolution for each of the plurality of views based on the priority for the at least one view.

4. The method as claimed in claim 1, wherein the applying, by the electronic device, the plurality of resolutions to each of the plurality of views of the window comprises any one or any combination of:

increasing the base resolution of at least one view from among the plurality of views;

decreasing the base resolution of at least one view from among the plurality of views; and maintaining the base resolution of at least one view from among the plurality of views.

5. An electronic device for identifying a dynamic resolution for an application, comprising:

a memory;

a processor; and a dynamic resolution controller that is operably connected to the memory and the processor, and is configured to:

identify a base resolution for a window of the application, wherein the window comprises a plurality of views;

identify a plurality of resolutions respectively corresponding to the plurality of views based on the base resolution and at least one characteristic of each of the plurality of views;

apply the plurality of resolutions to the plurality of views of the window, respectively; and control each of the plurality of views to be displayed in the plurality of resolutions, respectively, wherein the dynamic resolution controller is further configured to:

divide each of the plurality of views into a plurality of sub-views;

detect at least one characteristic of each of the plurality of sub-views;

detect, based on the at least one characteristic of each of the plurality of sub-views, a first set of sub-views from among the plurality of sub-views that display same content and a second set of sub-views from among the plurality of sub-views that display different content;

identify a priority for each of the plurality of sub-views based on the first set of sub-views, the second set of sub-views, and a dynamic resolution for each of the plurality of views; and identify a dynamic resolution for each of the plurality of sub-views based on the priority for each of the plurality of sub-views.

6. The electronic device as claimed in claim 5, wherein the dynamic resolution controller is further configured to:

detect at least one device parameter associated with the electronic device and at least one application parameter associated with the application; and apply a machine learning model to identify the base resolution based on the at least one device parameter and the at least one application parameter.

7. The electronic device as claimed in claim 6, wherein the at least one device parameter comprises at least one of a battery level of the electronic device, a primary memory usage of a primary memory of the electronic device, a secondary memory usage of a secondary memory of the electronic device, a graphics processing unit (GPU) usage of the electronic device, a central processing unit (CPU) usage of the electronic device, a number of applications running in the electronic device, a type of application running in the electronic device, or a mode of display of the electronic device.

8. The electronic device as claimed in claim 7, wherein the at least one application parameter comprises at least one of an average usage of the primary memory by the application, an average usage of the secondary memory by the application, a time of usage of the application, a number of times the application is used, a type of content displayed by the application, a category of the application, or a number of graphic components used by the application.

9. The electronic device as claimed in claim 5, wherein the dynamic resolution controller is further configured to:

detect the at least one characteristic of each of the plurality of views;

identify a priority for at least one view from among the plurality of views based on the at least one characteristic of the at least one view and the base resolution; and a dynamic resolution for each of the plurality of views based on the priority for the at least one view.

10. The electronic device as claimed in claim 9, wherein the at least one characteristic of each of the plurality of views is associated with at least one of a surface view, a texture view, a video view, an image view, a button, a checkbox, a time picker, a date picker, a radio button, a toast, an edit text, or a text view.

11. The electronic device as claimed in claim 10, wherein the at least one characteristic of each of the plurality of views is identified based on at least one of an interaction level, a size of view, a location of view on a screen of the electronic device, a z-order of views, a transparency level of view, or a type of content displayed in view.

12. The electronic device as claimed in claim 5, wherein the dynamic resolution controller is further configured to:

increase the base resolution of at least one view from among the plurality of views;

decrease the base resolution of at least one view from among the plurality of views; and maintain the base resolution of at least one view from among the plurality of views.

* * * * *